United States Patent
Takechi et al.

(10) Patent No.: US 9,500,861 B2
(45) Date of Patent: Nov. 22, 2016

(54) PROTECTIVE MEMBER AND METHOD FOR USING PROTECTIVE MEMBER

(71) Applicant: Panasonic Intellectual Property Management Co., Ltd., Osaka (JP)

(72) Inventors: Yohei Takechi, Osaka (JP); Hirotoshi Oikaze, Shiga (JP); Yasuhiro Kabetani, Osaka (JP); Tomotaka Furuta, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/889,136

(22) PCT Filed: Apr. 7, 2015

(86) PCT No.: PCT/JP2015/001938
§ 371 (c)(1),
(2) Date: Nov. 4, 2015

(87) PCT Pub. No.: WO2016/017049
PCT Pub. Date: Feb. 4, 2016

(65) Prior Publication Data
US 2016/0259162 A1    Sep. 8, 2016

(30) Foreign Application Priority Data
Jul. 30, 2014   (JP) ................. 2014-154459

(51) Int. Cl.
*G02B 1/00* (2006.01)
*G02B 27/00* (2006.01)
(Continued)

(52) U.S. Cl.
CPC ........... *G02B 27/0006* (2013.01); *G02B 21/00* (2013.01); *G02B 21/02* (2013.01); *G02B 21/33* (2013.01); *G11B 7/135* (2013.01); *G11B 7/22* (2013.01)

(58) Field of Classification Search
CPC .. G02B 21/00; G02B 21/33; G02B 27/0006; G02B 21/02; G11B 7/22; G11B 7/135; G11B 7/122
USPC ........................................ 359/507; 369/13.23
See application file for complete search history.

(56) References Cited

U.S. PATENT DOCUMENTS

2003/0123334 A1 *   7/2003   Fujimaki ................ G11B 7/122
                                                    369/13.23

FOREIGN PATENT DOCUMENTS

| JP | 62-121417 | 6/1987 |
| JP | 2001-091849 | 4/2001 |
| JP | 2006-235208 | 9/2006 |

OTHER PUBLICATIONS

International Search Report of PCT application No. PCT/JP2015/001938 dated Jul. 14, 2015.

*Primary Examiner* — Euncha Cherry
(74) *Attorney, Agent, or Firm* — Panasonic IP Management

(57) ABSTRACT

A protective member protects an objective lens. The protective member includes an insertion opening through which an objective lens is configured to be inserted and a main body configured to cover the inserted objective lens. The main body includes a side wall portion connected to the insertion opening and a bottom portion connected to the side wall portion as well as facing the insertion opening, and covers the inserted objective lens with the side wall portion and the bottom portion. The protective member further includes a liquid disposed inside the main body, a sealing film body for sealing the insertion opening and a window arranged in the bottom portion of the main body, through which light transmits. The protective member can simplify the work.

12 Claims, 5 Drawing Sheets

(51) Int. Cl.
*G02B 21/00* (2006.01)
*G11B 7/135* (2012.01)
*G11B 7/22* (2006.01)
*G02B 21/33* (2006.01)
*G02B 21/02* (2006.01)

PROTECTIVE MEMBER AND METHOD FOR USING PROTECTIVE MEMBER

TECHNICAL FIELD

The present invention relates to a protective member for protecting an objective lens.

BACKGROUND ART

A method of observing a specimen in a state where a space between the specimen and an immersion objective lens is filled with a liquid is known. FIG. 8 is a cross-sectional view of a protective member 21 as a lens cover for protecting an objective lens 20, which is disclosed in Patent Literature 1.

The protective member 21 includes a cap 22, a resin film 23, a fixing device 24 and an optical window 25. After the liquid is dropped into the protective member 21, the protective member 21 is attached to the objective lens 20, then, the specimen is observed through the optical window 25.

CITATION LIST

Patent Literature

PTL 1: JP-A-2006-235208

SUMMARY

The protective member protects the objective lens. The protective member has an insertion opening through which the objective lens is configured to be inserted and a main body configured to cover the inserted objective lens. The main body has a side wall portion connected to the insertion opening and a bottom portion connected to the side wall portion and facing the insertion opening, which covers the inserted objective lens with the side wall portion and the bottom portion. The protective member further includes a liquid disposed inside the main body, a sealing film body sealing the insertion opening and a window arranged in the bottom portion of the main body, through which light transmits.

The protective member can simplify the work.

DETAILED DESCRIPTION OF PREFERRED EMBODIMENTS

Figure 1:
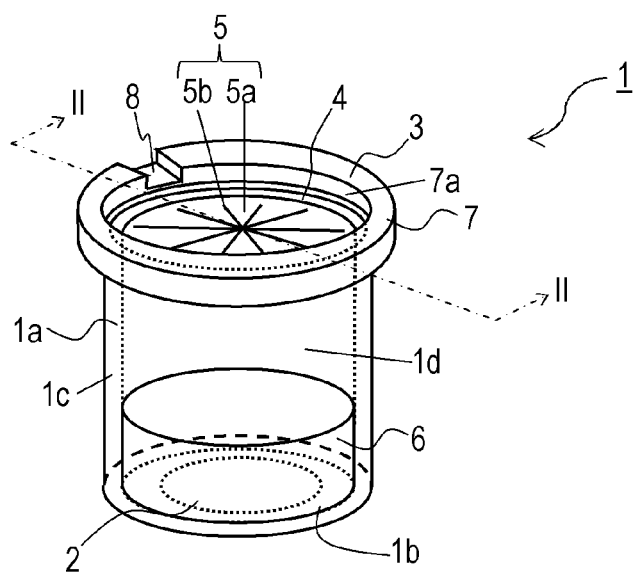
FIG. 1 is a schematic perspective view of a protective member according to an embodiment.
Figure 2:
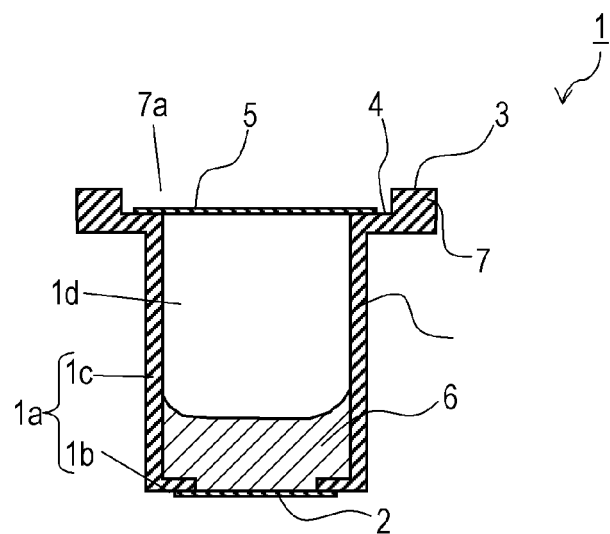
FIG. 2 is a schematic cross-sectional view taken along line II-II of the protective member shown in FIG. 1.

FIG. 1 is a schematic perspective view of a protective member 1 according to Embodiment 1. FIG. 2 is a schematic cross-sectional view taken along line II-II of the protective member 1 shown in FIG. 1. The projective member 1 has a cylindrical main body 1a, and a window 2 through which light transmits is provided in a bottom portion 1b. An insertion opening 7 is disposed in a side facing the bottom portion's side of the main body 1a. The insertion opening 7 is provided with a flange surface 3 formed around the opening and a flange surface 4 positioned around the insertion opening 7 and arranged closer to the bottom portion 1b than the flange surface 3. A liquid 6 as an immersion medium is arranged in an internal space 1d of the main body 1a. A sealing film body 5 as a sealing film is disposed in the insertion opening 7 to thereby prevent leakage of the liquid 6 from the main body 1a. Accordingly, the protective member 1 enclosing the liquid 6 in advance can be realized. More specifically, the sealing film body 5 is disposed in the flange surface 4. The sealing film body 5 is adhered to the flange surface 4. The flange surface 4 has an annular shape surrounding an opening 7a, and the flange surface 3 has an annular shape surrounding the flange surface 4 and the opening 7a.

The insertion opening 7 has the opening 7a for inserting an objective lens 9. The main body 1a has a side wall portion 1c connected to the insertion opening 7 and a bottom portion 1b connected to the side wall portion 1c, and positioned in the opposite side of the insertion opening 7. The main body 1a forms the internal space 1d surrounded by the side wall portion 1c and the bottom portion 1b and housing the inserted objective lens 9, and covers the inserted objective lens 9.

A method of using the protective member 1 will be explained as follows.

Figure 3:
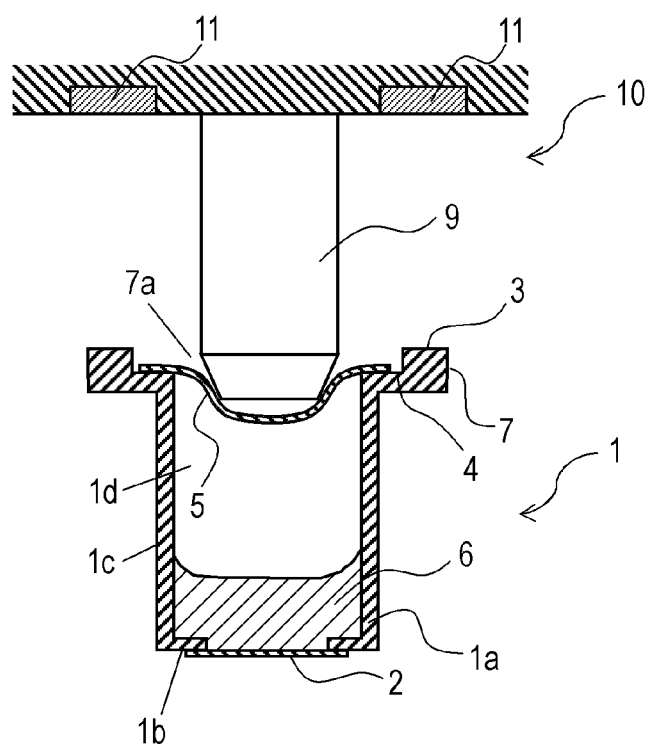
FIG. 3 is a schematic view of the protective member according to the embodiment just before being attached to an objective lens.

FIG. 3 is a schematic view of the protective member 1 just before the protective member 1 is attached to the immersion objective lens 9. The objective lens 9 is provided in a mounting surface 11 of a microscope 10. As shown in FIG. 3, the objective lens 9 is inserted into the internal space 1d of the main body 1a for covering the objective lens 9 from the insertion opening 7 having the opening 7a for inserting the objective lens 9. At this time, the sealing film body 5 is pushed onto the objective lens 9. Then, the sealing film body 5 is broken, the objective lens 9 is inserted into the main body 1a in which the liquid 6 is disposed, the objective lens 9 is covered with the main body 1a and the objective lens 9 faces the window 2 through the liquid 6. After that, the objective lens 9 is inserted into the internal space 1d of the main body 1a until reaching a position where the flange surface 3 closely contacts the mounting surface 11.

Figure 4:
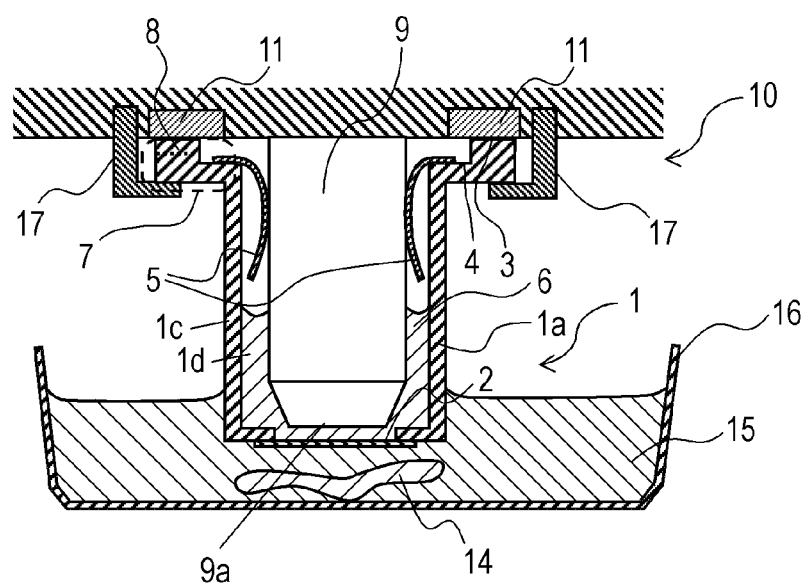
FIG. 4 is a schematic view of the objective lens to which the protective member is attached according to the embodiment.

FIG. 4 is a schematic view of the objective lens 9 to which the protective member 1 is attached. The protective member 1 is fixed to the microscope 10 by grasping the insertion opening 7 by a fixing member 17 as shown in FIG. 4. The protective member 1 is thus attached to the objective lens 9, and the objective lens 9 is protected by the protective member 1.

In the state where the protective member 1 is attached, a tip end portion 9a of the objective lens 9 is immersed in the liquid 6, and a space between the window 2 and the tip end portion 9a of the objective lens 9 is filled with the liquid 6. When a cell sample 14 as a specimen immersed in a culture solution 15 inside a sample container 16 is set, a state where a space between the objective lens 9 and the cell sample 14 is filled with the liquid 6 and the culture solution 15 can be realized. At this time, the culture solution 15 does not directly contact the object lens 9. The cell sample 14 also does not contact the objective lens 9. Therefore, the objective lens 9 can be kept clean. After the observation is finished, the protective member 1 is detached from the objective lens 9, and the protective member 1 is discarded. The culture solution 15 and the liquid 6 are the same liquid, and water is adopted for them in the embodiment.

Figure 8:
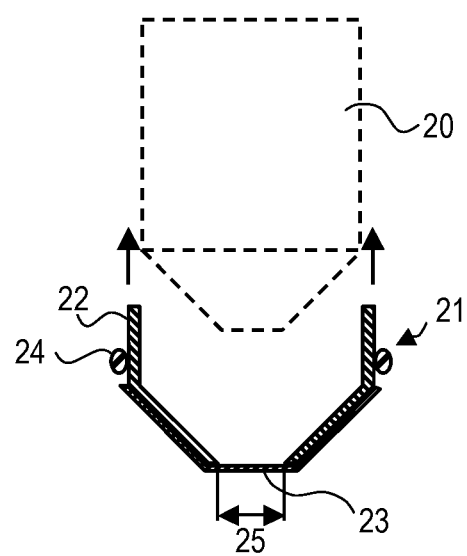
FIG. 8 is a cross-sectional view of a related-art protective member.

As it is necessary to drop the liquid into the protective member 21 just before being attached to the objective lens 20 in the related-art protective member 21 shown in FIG. 8, the work will be complicated.

As it is not necessary to drop the liquid 6 into the protective member 1 just before the attachment by arranging the liquid 6 inside the internal space 1*d* in advance in the protective member 1 according to the embodiment, the work can be simplified when using the protective member 1.

When the sealing of the sealing film body 5 is broken, fragments of the sealing film body 5 remain in the flange surface 4. As the flange surfaces 4 and 3 are separated from each other, the fragments of the sealing film body 5 do not affect the attachment accuracy of the protective member 1. The positional relationship between the objective lens 9 and the window 2 is stabilized as the flange surface 3 contacts the mounting surface 11 of the objective lens, therefore, optical characteristics are stabilized and good observation can be performed. On the other hand, when the sealing film body 5 is peeled off, rags of the sealing film body 5 and an adhesive remain on the flange surface 4. However, the attachment accuracy of the protective member 1 can be kept high as the flange surface 3 contacts the mounting surface 11 where the objective lens 9 is provided.

A process from attachment to detachment of the protective member 1 may be executed automatically by industrial machinery or an industrial robot, and is not limited to a worker. Accordingly, the work can be automatically performed in a sterilized sealed space such as an incubator used for cell culture and so on.

The internal space 1*d* of the main body 1*a* is designed to be larger than an external size of a lens barrel of the objective lens 9. Accordingly, the main body 1*a* does not contact the objective lens 9, which prevents the occurrence of trouble in the attachment.

An inside diameter size of the internal space 1*d* of the main body 1*a* is, for example, a diameter of 40 mm, and an external size of the objective lens 9 is a diameter of 32 mm. The flange surface 3 has the annular shape having, for example, an outside diameter of 55 mm and an inside diameter of 45 mm. The flange surface 4 has the annular shape having, for example, an outside diameter of 45 mm and an inside diameter of 40 mm.

The window 2 may be a portion which forms part of the main body 1*a*, and may be a thin glass plate or a transparent resin plate closing a hole provided in the bottom portion 1*b* of the main body 1*a*. The window 2 has at least a transparent structure which transmits light without being an optical hindrance at the time of observation.

The window 2 is designed to be larger than the size of the tip end portion 9*a* of the objective lens 9, specifically, for example, a diameter thereof is 20 mm.

As the sealing film body 5, a plastic film, a metal deposited film, a plastic plate, a metal foil, a coated paper can be adopted.

The main body 1*a* is made of a material such as resin, glass or metal. It is preferable that the main body 1*a* is made of a transparent material because the attachment state of the protective member 1 can be checked from the outside. Transparency indicates a state in which the transmittance is 10% or more and the haze is 1% or less in a visible light region (360 nm to 830 nm).

It is also possible to adopt oil as the culture solution 15 and for the liquid 6.

The quantity of the liquid 6 which is enclosed in advance is, for example, 25 ml.

It is also possible to adopt a clamping mechanism or a chuck mechanism as the fixing member 17. It is also possible to fix the protective member 1 by sucking only the flange surface 3 by a negative pressure or by vacuum. Alternatively, it is also possible to fix the protective member 1 by hooking the insertion opening 7 at a key groove or a U-shape formed in the mounting surface 11.

The work will be simplified by breaking through the sealing film body 5 rather than peeling off the sealing film body 5. The structure for improving the easiness of breaking the sealing body film 5 will be explained.

As shown in FIG. 1, the sealing film body 5 includes an area 5*a* and an area 5*b* which is thinner than the area 5*a*. As the area 5*b* does not penetrate the sealing film body 5 in a thickness direction, the liquid 6 does not leak from the main body 1*a*. In this case, when a force of breaking through the sealing film body 5 is added from the outside, the sealing film body 5 is easily broken from the area 5*b* as a starting point. It is preferable that the area 5*b* is formed radially toward the periphery from the center of the sealing film body 5. As the sealing film body 5 broken from the area 5*b* is pulled away so as to be along an inside surface of the side wall portion 1*c* of the main body 1*a*, the sealing film body 5 does not interfere with the observation after being broken.

In the embodiment, for example, the thickness of the area 5*a* is 100 μm and the thickness of the area 5*b* is 30 μm.

It is also possible that a groove 8 for releasing air is provided in the flange surface 3. As the air inside the main body 1*a* is not compressed and is released from the groove 8, the increase of the pressure inside the main body 1*a* can be prevented. Therefore, it is possible to prevent optical characteristics from being deteriorated due to deformation of the window 2 or to prevent the window 2 from being broken by the internal pressure of the main body 1*a*. As the groove 8 is provided in the flange surface 3, the sealed state of the opening 7*a* by the sealing film body 5 is not broken. The groove 8 may be a triangular or semicircle groove in addition to the square groove. As shown in FIG. 4, the groove 8 is formed so as to communicate between the internal space 1*d* of the main body 1*a* and the external space when the objective lens 9 is protected, namely, when the objective lens 9 is inserted into the opening 7*a* of the insertion opening 7.

In the embodiment, the groove 8 has, for example, a height of 2 mm and a width of 2 mm.

Figure 5:
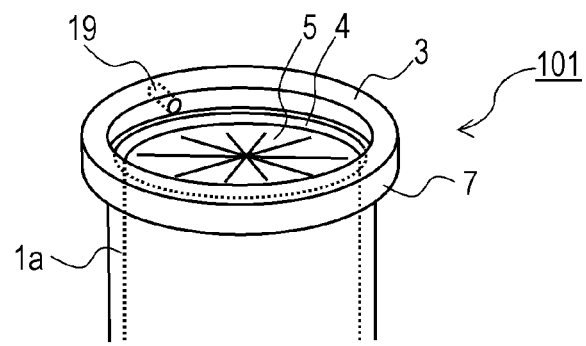
FIG. 5 is a schematic perspective view of another protective member according to the embodiment.

FIG. 5 is a schematic perspective view of another protective member 101 according to the embodiment. In FIG. 5, the same reference numerals are added to the same components as in the protective member 1 shown in FIG. 1. In the protective member 101, a hole 19 communicating between the internal space 1*d* of the main body 1*a* and the external space is provided between the flange surfaces 3 and 4 of the insertion opening 7 instead of the groove 8 of the protective member 1 as shown in FIG. 5. The hole 19 is designed to have a size whereby the sealed state by the flange surface 4 and the sealing film body 5 is not broken. As the internal space 1*d* of the main body 1*a* can communicate with the external space by the hole 19 when the objective lens 9 is protected, namely, when the objective lens 9 is inserted into the opening 7a of the insertion opening 7, the pressure inside the main body 1a is not increased and it is possible to prevent optical characteristics from being deteriorated due to deformation of the window 2 or to prevent the window 2 from being broken by the internal pressure of the main body 1a.

In the embodiment, a diameter of the hole 19 is 1 mm when the distance between the flange surfaces 3 and 4 is, for example, 3 mm.

Figure 6:
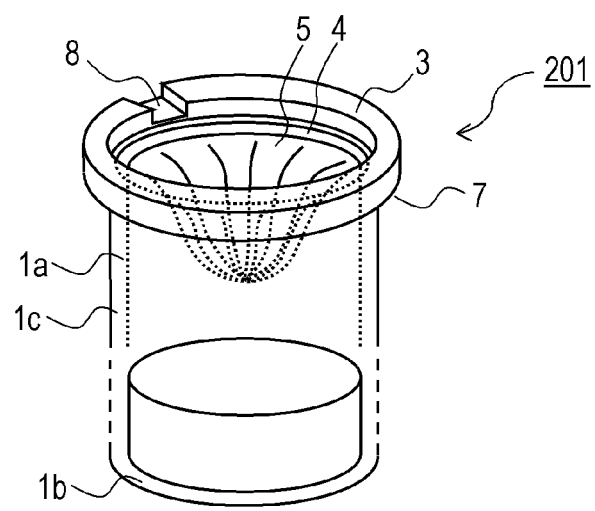
FIG. 6 is a schematic perspective view of further another protective member according to the embodiment.

FIG. 6 is a schematic perspective view of further another protective member 201 according to the embodiment. In FIG. 6, the same reference numerals are added to the same components as in the protective member 1 shown in FIG. 1. In the protective member 201 shown in FIG. 6, the sealing film body 5 has a shape which is concave toward the bottom portion 1b of the main body 1a. Accordingly, the sealing film body 5 can be broken through easily by the objective lens 9.

Figure 7:
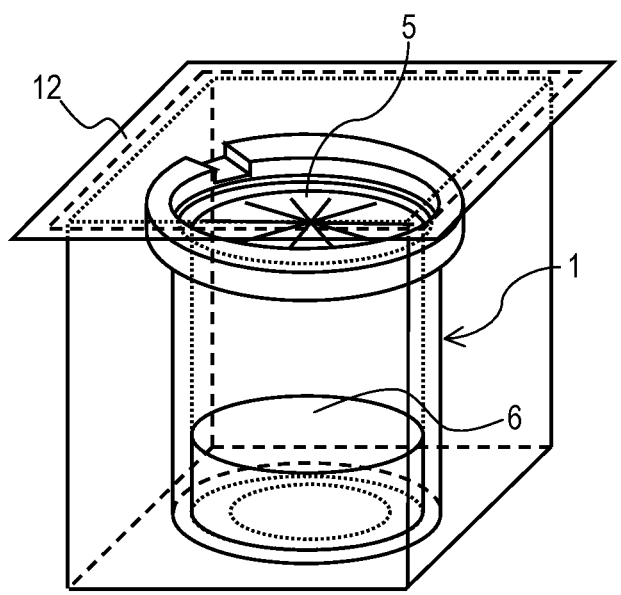
FIG. 7 is a schematic view of a protective member according to the embodiment in a packaged state.

FIG. 7 is a schematic view of the protective member 1 packaged by a packaging container 12. The protective member 1 in which the liquid 6 is injected inside the internal space 1d and the opening 7a is sealed by the sealing film body 5 is sealed inside the packaging container 12. The sterilization treatment (for example, gamma irradiation treatment, electron beam irradiation treatment, ethylene oxide gas treatment and the like) is performed to the protective member 1 through the packaging container 12, thereby keeping the protective member 1 clean. The proper quantity of the liquid 6 is enclosed so as not to overflow the protective member 1. Accordingly, the protective member 1 can be used easily.

The respective components in the embodiment may be arbitrarily combined within a scope not departing from the gist of the invention.

INDUSTRIAL APPLICABILITY

The protective member according to the present invention can be applied to applications of measurement and evaluation in a cell culture facility.

The invention claimed is:

1. A protective member for protecting an objective lens; comprising:
    an insertion opening through which the objective lens is configured to be inserted;
    a main body including a side wall portion connected to the insertion opening and a bottom portion connected to the side wall portion and facing the insertion opening, the main body configured to cover the inserted objective lens with the side wall portion and the bottom portion;
    a liquid disposed inside the main body;
    a sealing film body configured to seal the insertion opening; and
    a light transmittable window arranged in the bottom portion of the main body.

2. The protective member according to claim 1,
    wherein the insertion opening is provided with a first flange surface provided around the insertion opening, and a second flange surface provided around the insertion opening and arranged closer to the bottom portion than the first flange surface, and
    the sealing film body is provided in the second flange surface.

3. The protective member according to claim 1,
    wherein the sealing film body is configured to be broken when the objective lens is inserted through the insertion opening.

4. The protective member according to claim 1,
    wherein the sealing film body includes a first area and a second area thinner than the first area.

5. The protective member according to claim 4,
    wherein the sealing film body is configured to be broken from the second area as a starting point when the objective lens is inserted through the insertion opening.

6. The protective member according to claim 4,
    wherein the second area is arranged radially toward a periphery from a center of the sealing film body.

7. The protective member according to claim 2,
    wherein the main body is provided with an internal space surrounded by the side wall portion and the bottom portion as well as housing the inserted objective lens, the liquid being disposed within the internal space, and
    the first flange surface is provided with a groove communicating between the internal space of the main body and an external space when the objective lens is inserted through the insertion opening.

8. The protective member according to claim 2,
    wherein the main body is provided with an internal space surrounded by the side wall portion and the bottom portion as well as housing the inserted objective lens, the liquid being disposed within the internal space, and
    a hole communicating between the internal space of the main body and an external space when the objective lens is inserted into the insertion opening is provided between the first flange surface and the second flange surface of the insertion opening.

9. The protective member according to claim 1,
    wherein the sealing film body has a shape which is concave toward the bottom portion.

10. A method for using a protective member, said method comprising:
    providing a protective member having a main body including an insertion opening, a side wall portion connected to the insertion opening and a bottom portion connected to the side wall portion and facing the insertion opening, the main body further including a liquid disposed therein, a sealing film body configured to seal the insertion opening, and a light transmittable window arranged in the bottom portion;
    breaking the sealing film body by inserting an objective lens through the insertion opening and covering the inserted objective lens with the side wall portion and the bottom portion; and
    transmitting light through the light transmittable window arranged in the bottom portion of the main body.

11. The method according to claim 10,
    wherein the breaking the sealing film body occurs from a second area as a starting point when the objective lens is inserted through the insertion opening, the sealing film body including a first area and a second area thinner than the first area.

12. The method according to claim 10, further comprising:
    relieving pressure from the main body when the objective lens is inserted through the insertion opening by providing a hole configured to communicate between an internal space of the main body and an external space.

* * * * *